US012271003B2

(12) United States Patent
Kamakura

(10) Patent No.: US 12,271,003 B2
(45) Date of Patent: Apr. 8, 2025

(54) IMAGE DISPLAY DEVICE

(71) Applicant: SEIKO EPSON CORPORATION, Tokyo (JP)

(72) Inventor: Kazuya Kamakura, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 592 days.

(21) Appl. No.: 17/586,366

(22) Filed: Jan. 27, 2022

(65) Prior Publication Data
US 2022/0236578 A1 Jul. 28, 2022

(30) Foreign Application Priority Data
Jan. 28, 2021 (JP) ................. 2021-011759

(51) Int. Cl.
G02B 27/01 (2006.01)
(52) U.S. Cl.
CPC ..... G02B 27/0176 (2013.01); G02B 27/0172 (2013.01); *G02B 2027/0161* (2013.01); *G02B 2027/0178* (2013.01)
(58) Field of Classification Search
CPC .... G02B 27/01–0189; G02B 2027/0105–0198
See application file for complete search history.

(56) References Cited

U.S. PATENT DOCUMENTS

2017/0192198 A1* 7/2017 Bristol ................. G02B 7/22

FOREIGN PATENT DOCUMENTS

JP 2017-212475 A 11/2017
WO 2016/052134 A1 4/2016

* cited by examiner

*Primary Examiner* — Bao-Luan Q Le
*Assistant Examiner* — Christopher A Lamb, II
(74) *Attorney, Agent, or Firm* — Oliff PLC

(57) ABSTRACT

A display unit including an optical system configured to emit imaging light toward a pupil position, and a frame configured to support the optical system, an exterior member configured to accommodate the optical system of the display unit in an internal space and partially exposes the frame, and a sheet-shaped sealing member having flexibility configured to seal the internal space of the exterior member are included, wherein the sealing member includes an outer first sealing portion configured to perform sealing between the sealing member and the exterior member, and an inner second sealing portion configured to perform sealing between the sealing member and the frame.

13 Claims, 11 Drawing Sheets

IMAGE DISPLAY DEVICE

The present application is based on, and claims priority from JP Application Serial Number 2021-011759, filed Jan. 28, 2021, the disclosure of which is hereby incorporated by reference herein in its entirety.

BACKGROUND

1. Technical Field

The present disclosure relates to an image display device that enables observation of a virtual image, and particularly relates to an image display device in which an optical system is partially accommodated in an exterior member.

2. Related Art

As an image display device, a head-mounted display (hereinafter also referred to as "HMD") having a structure in which a housing accommodating an optical system that guides imaging light in a vertical direction is covered by an external cover, and the external cover is attached to a frame for head mounting (JP-A-2017-212475). In this HMD, a separation surface of the housing is waterproofed by disposing and sandwiching a seal member that covers the entire circumference at the separation surface of the housing, which accommodates an optical component and is separated into a half body, as well as a base end portion of an image display member.

In the HMD of JP-A-2017-212475, the housing accommodating the optical system is waterproofed and the housing is attached to the frame via the external cover, therefore, there is a problem in that the overall device becomes larger and heavier in weight than the housing accommodating the optical system.

SUMMARY

An image display device according to one aspect of the present disclosure includes a first display unit that includes: a first optical system that emits an imaging light toward a pupil position, and a first frame that supports the first optical system, a first cover member that accommodates the first optical system and that exposes a portion of the first frame, an exterior member that accommodates the first cover member, and a sheet-shaped member that has flexibility and that includes: a first portion that is sandwiched by the exterior member, and a second portion that is sandwiched between the first frame and the first cover.

DESCRIPTION OF EXEMPLARY EMBODIMENTS

Hereinafter, a structure, operation, manufacturing method, etc. of an image display device according to the present disclosure will be described with reference to FIGS. 1 to 3, etc.

Figure 1:
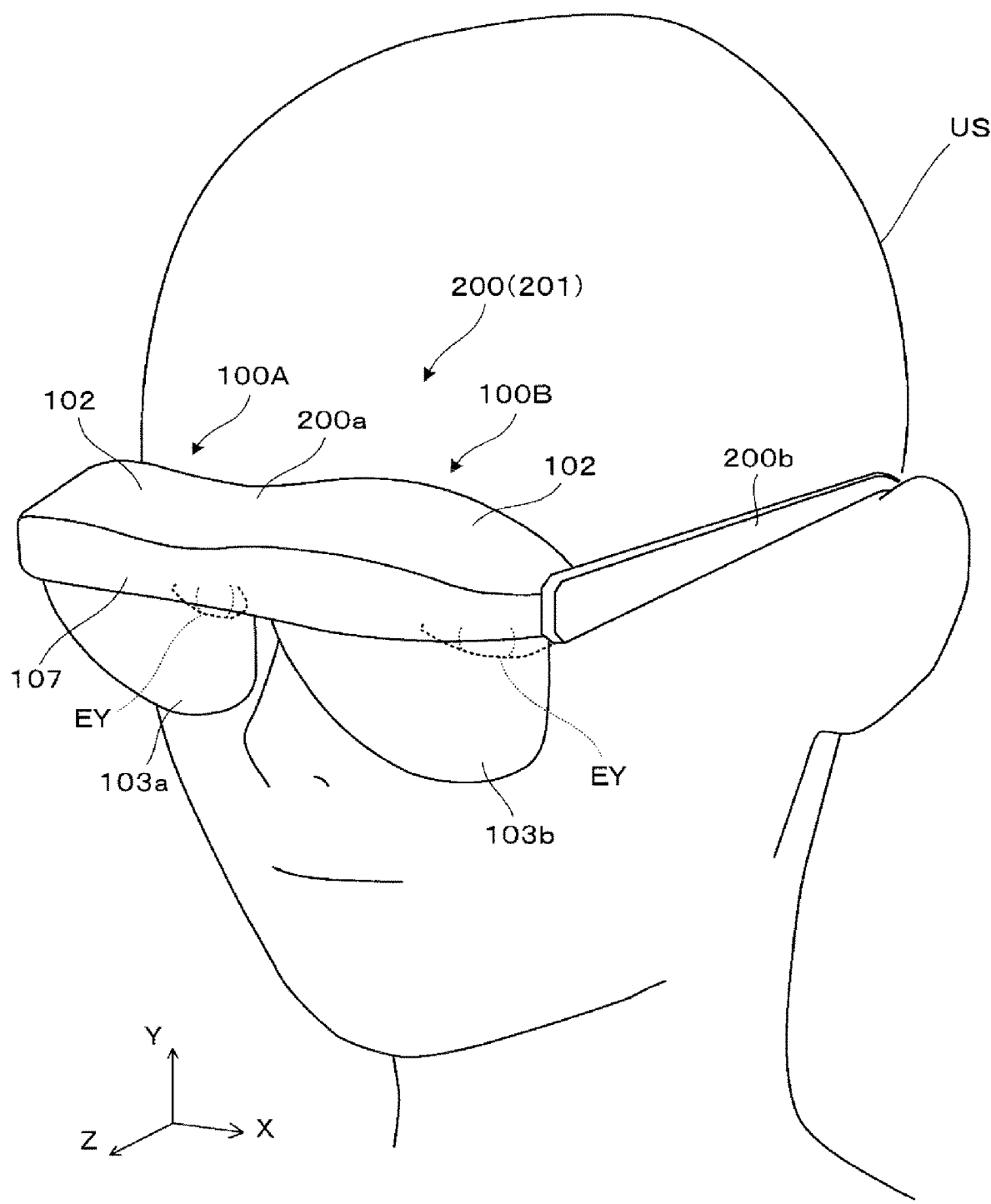
FIG. 1 is an external perspective view illustrating a wearing state of an image display device according to a first exemplary embodiment.
Figure 2:
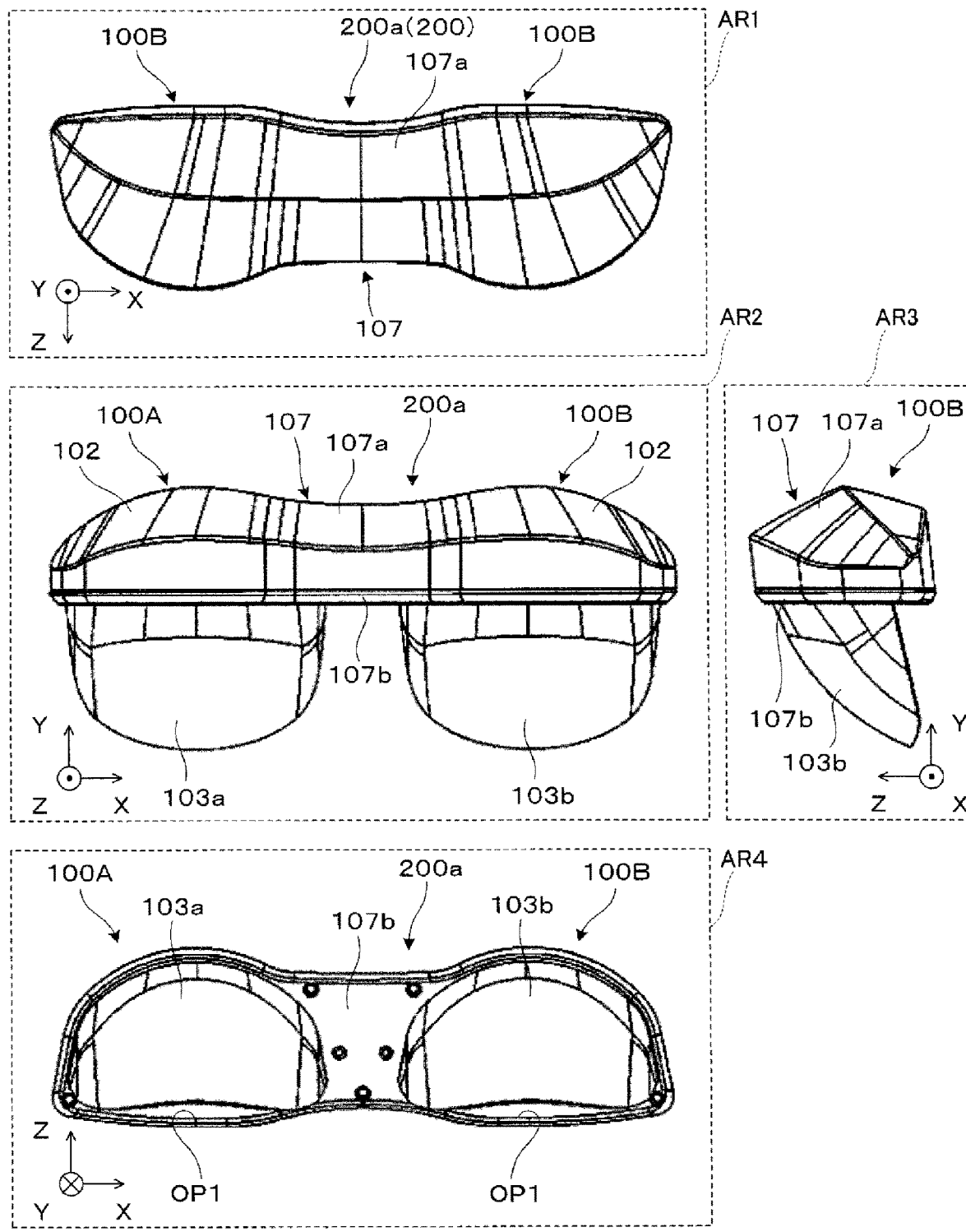
FIG. 2 is a plan view, front view, side view, and bottom view of the image display device.

FIG. 1 is a diagram illustrating a wearing state of an image display device 200. The image display device 200 is a head-mounted display, i.e., HMD 201, and causes an observer or a wearer US who wears the head-mounted display 201 to recognize an image as a virtual image. In FIG. 1, etc., X, Y, and Z correspond to an orthogonal coordinate system, a +X direction corresponds to a lateral direction in which the two eyes EY of the observer or wearer US who is wearing the image display device 200 or HMD 201 are arranged, a +Y direction corresponds to an upward direction orthogonal to the lateral direction in which the two eyes EY of the wearer US are arranged, and a +Z direction corresponds to a direction to the front or a forward direction for the wearer US. A ±Y direction is parallel to a vertical axis or a vertical direction.

The image display device 200 includes a main body 200a disposed to cover the front of the wearer US and a pair of temple support devices 200b that support the main body 200a. The main body 200a, when functionally viewed, includes a first display device 100A for the right eye and a second display device 100B for the left eye. The first display device 100A includes a display driving unit 102 disposed at an upper portion thereof, and a combiner 103a that is shaped like a spectacle lens and covers the front of the eye. Similarly, the second display device 100B includes a display driving unit 102 disposed at an upper portion thereof, and a combiner 103b that is shaped like a spectacle lens and covers the front of the eye.

The appearance of the main body 200a of the image display device 200 will be described with reference to FIG. 2. In FIG. 2, a region AR1 is a plan view of the main body 200a, a region AR2 is a front view of the main body 200a, a region AR3 is a right side view of the main body 200a, and a region AR4 is a bottom view of the main body 200a. A pair of the display driving units 102 disposed on the +Y side or the upper side of the main body 200a are coupled and integrated, and are covered by a dome-shaped upper exterior member 107a elongated in the lateral direction and a flat plate-shaped lower exterior member 107b. A combination of the upper exterior member 107a and the lower exterior member 107b is referred to as an exterior member 107. The first combiner 103a and the second combiner 103b have a shape such that an upper portion of a hemisphere protruding in the forward or the +Z direction is cut, and is disposed so as to protrude downward from the lower exterior member 107b.

Figure 3:
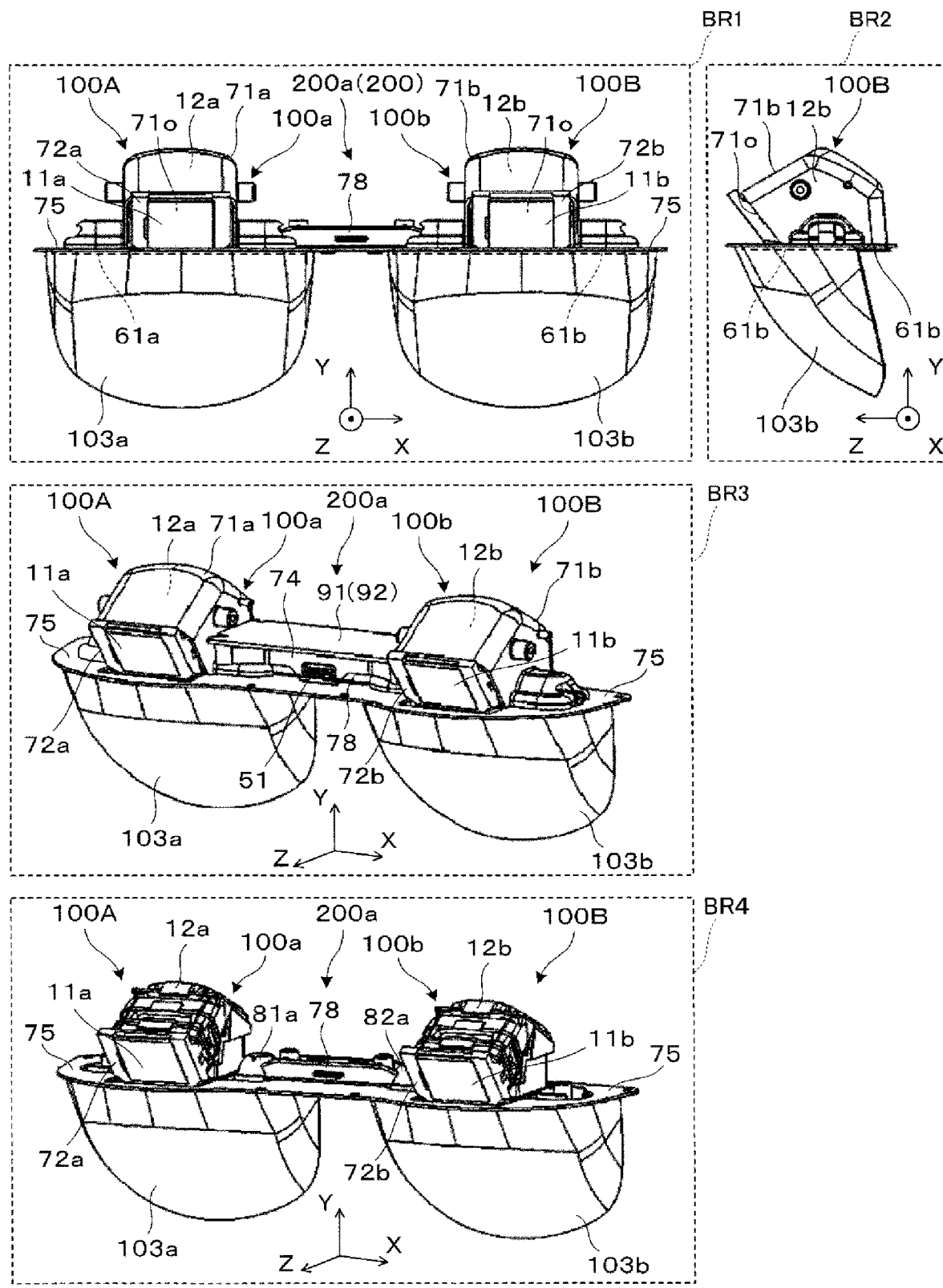
FIG. 3 is a front view, side view, perspective view, etc. illustrating an interior of the image display device with an exterior member removed.

With reference to FIG. 3, an overview of an internal structure in which the upper exterior member 107a and the lower exterior member 107b have been removed from the main body 200a illustrated in FIG. 2 will be described. In FIG. 3, a region BR1 is a front view with an upper portion of the main body 200a exposed, a region BR2 is a right side view with the upper portion of the main body 200a exposed, a region BR3 is a perspective view with the upper portion of the main body 200a exposed, and a region BR4 is a perspective view with an internal optical system of the main body 200a exposed. The first display device 100A for the right eye includes a first display element 11a, a first optical system 12a, and the first combiner 103a, as the first display unit 100a. A first frame 61a described below is also an element of the first display unit 100a. The first optical system 12a is covered with a first cover member 71a, which is an inner cover. The first display element 11a is disposed so as to close an opening 710 of the first cover member 71a, and is fixed to an outer frame of the first optical system 12a via a first holder 72a having a rectangular frame shape.

Figure 4:
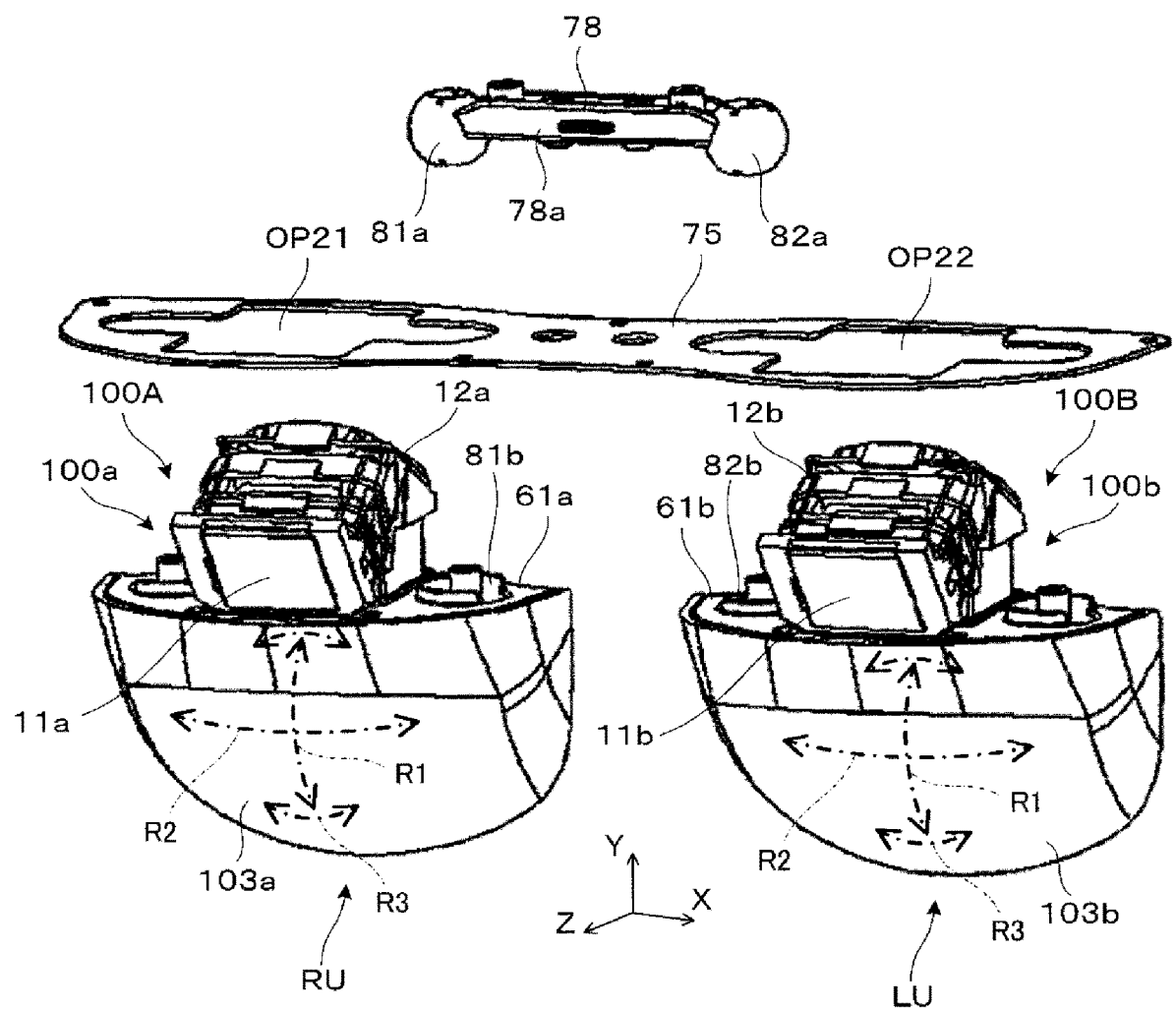
FIG. 4 is an exploded perspective view of the remainder of the portion where the exterior member is removed from the image display device.

As illustrated in FIG. 4, the first optical system 12a is fixed to an upper surface of the plate-shaped first frame 61a by adhesion, etc., and the first combiner 103a is fixed to the front half of the periphery of the first frame 61a by adhesion, etc. at an upper end thereof.

Referring back to FIG. 3, the second display device 100B includes a second display element lib, a second optical system 12b, and the second combiner 103b, as the second display unit 100b. A second frame 61b described below is also an element of the second display unit 100b. The second optical system 12b is covered with a second cover member 71b, which is an inner cover. The second display element 11b is disposed so as to close the opening 710 of the second cover member 71b, and is fixed to an outer frame of the second optical system 12b via the second holder 72b having a rectangular frame shape. The second display device 100B for the left eye has the same structure and function as the first display device 100A for the right eye. In other words, the second display element 11b is the same as the first display element 11a, the second optical system 12b is the same as the first optical system 12a, and the second combiner 103b is the same as the first combiner 103a. However, in a case where the first optical system 12a, the first combiner 103a, etc. have asymmetry with respect to the left and right X direction, the second optical system 12b, the second combiner 103b, etc. are obtained by laterally inverting the first optical system 12a, the first combiner 103a, etc.

As illustrated in FIG. 4, the second optical system 12b is fixed to an upper surface of the plate-shaped second frame 61b by adhesion, etc., and the second combiner 103b is fixed to the front half of the periphery of the second frame 61b by adhesion, etc. at an upper end thereof.

Referring back to FIG. 3, the first display device 100A and the second display device 100B are coupled via a fixing member 78 therein. The fixing member 78 is a rod-shaped metal member, and is formed from, for example, a magnesium alloy. By forming the fixing member 78 from the magnesium alloy, the first frame 61a and the second frame 61b can be cooled by heat dissipation. The fixing member 78 fixes the first display unit 100a and the second display unit 100b relative to each other at both ends thereof. The fixing member 78 is a member corresponding to an arm of a balance, and supports a pair of the display units 100a, 100b corresponding to a pair of plates in the center. The fixing member 78 has a shape that allows the first optical system 12a and the second optical system 12b to rotate in rotational directions along two or more axes when the first display unit 100a and the second display unit 100b are aligned prior to fixing.

Figure 5:
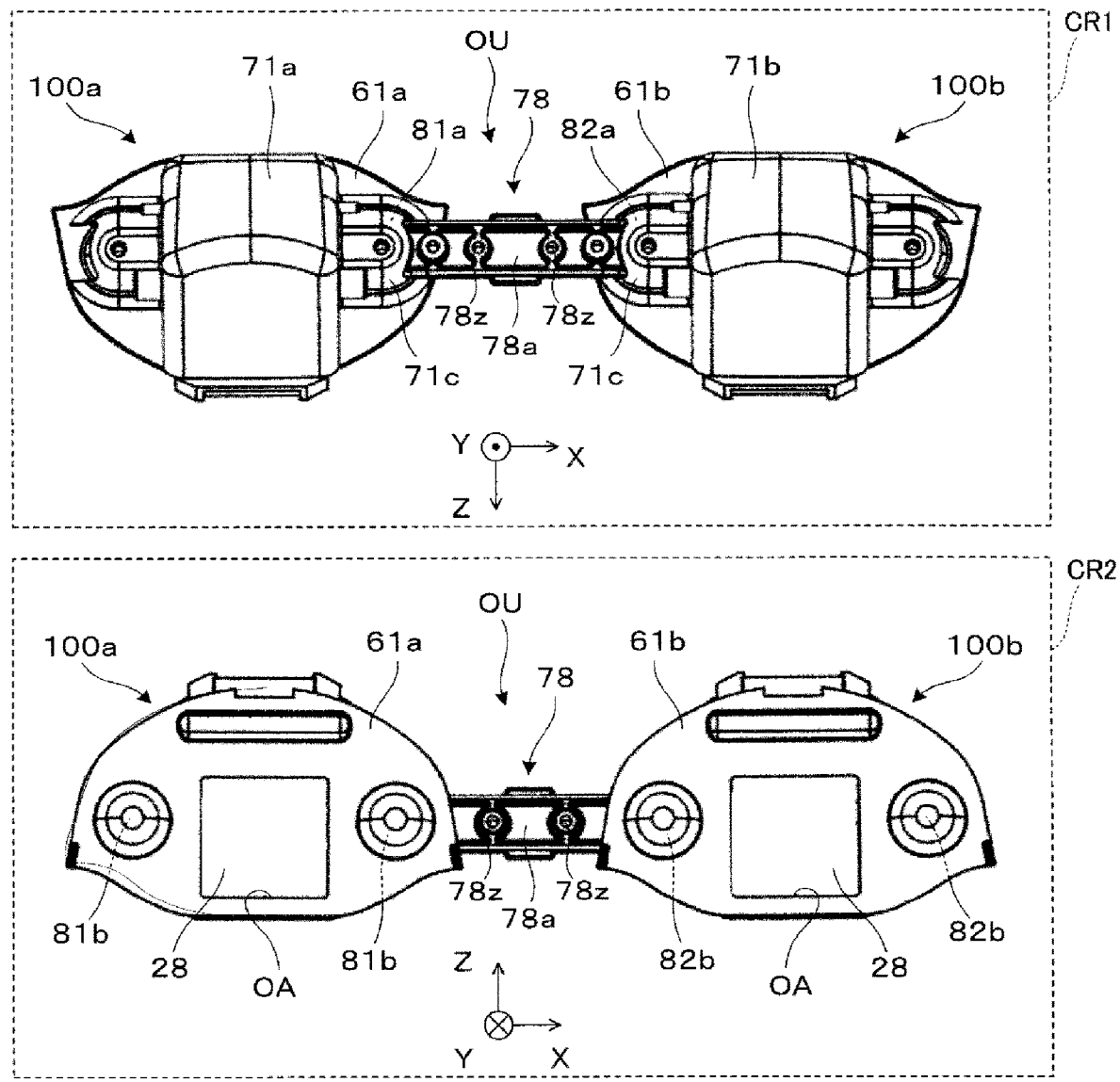
FIG. 5 is a plan view and a bottom view of an optical unit at which left and right display units are combined.
Figure 6:
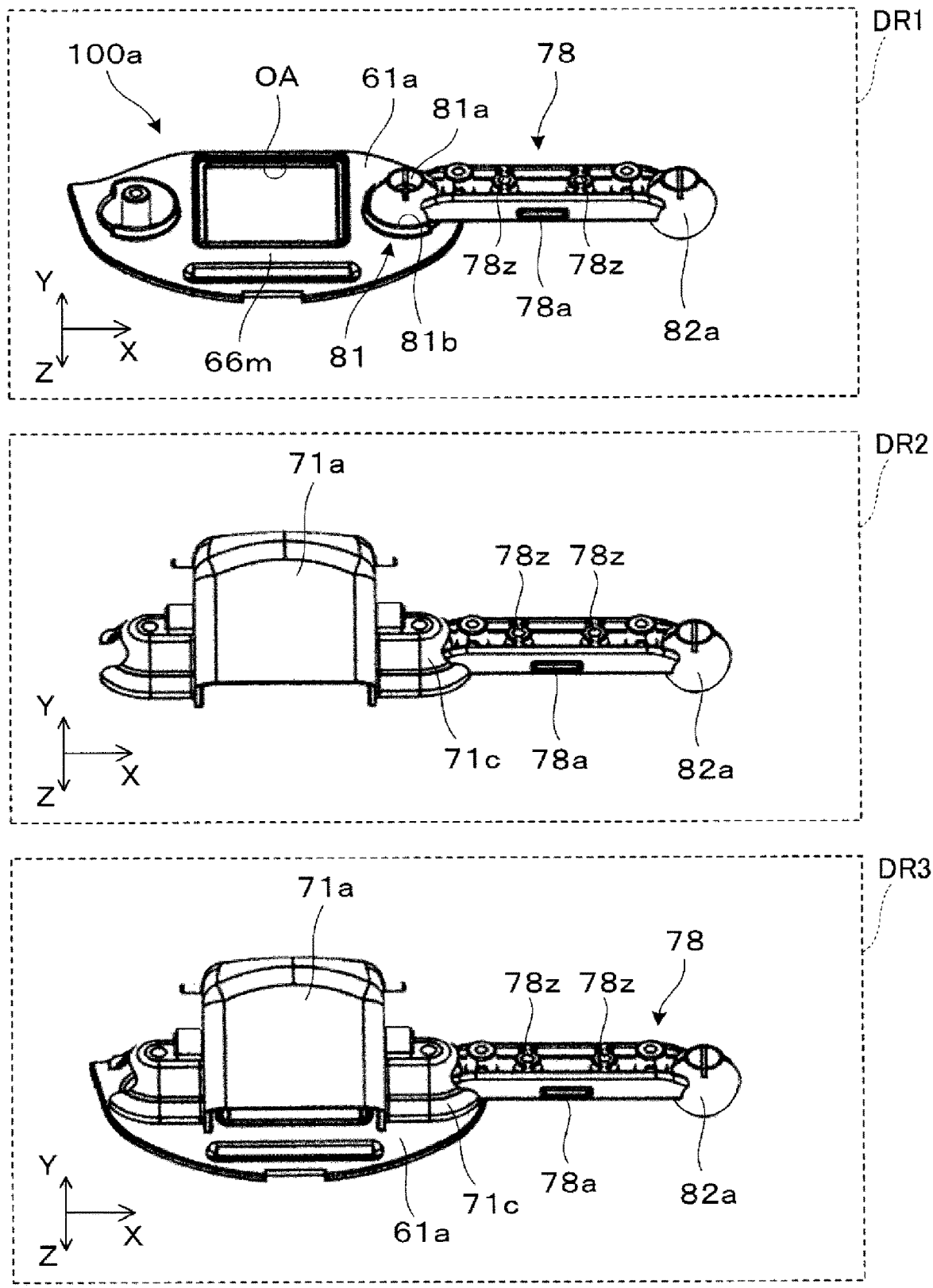
FIG. 6 is a perspective view describing a coupling between a first frame and a fixing member, a perspective view describing a positional relationship between the fixing member and a first cover member, and a perspective view describing a positional relationship between the first frame, the fixing member, and the first cover member.

The support of the first display unit 100a and the second display unit 100b by the fixing member 78 will be described with reference to FIGS. 4 to 6. In FIG. 5, a region CR1 is a plan view of an optical unit OU coupled to the left and right display units 100a, 100b, and a region CR2 is a bottom view of the optical unit OU. In FIG. 6, a region DR1 is a perspective view describing a coupling between the first frame 61a and the fixing member 78, a region DR2 is a perspective view describing a positional relationship between the fixing member 78 and the first cover member 71a, and a region DR3 is a perspective view describing a positional relationship between the first frame 61a, the fixing member 78, and the first cover member 71a. Fixing portions 81a, 82a, which are spherical members, are formed at both ends of the fixing member 78. After the first display unit 100a and the second display unit 100b are aligned, these fixing portions 81a, 82a are attached to concave portions 81b, 82b, which are hemispherical indentation members provided at the inner ends of the display units 100a, 100b or the frame 61a, 61b by an adhesive material, etc., whereby the rotation is stopped. A coupling member 81 that combines the fixing portion 81a and the concave portion 81b has a ball joint type bearing structure, and is covered by an extending portion 71c of the first cover member 71a. A bearing-shaped coupling member 82 that combines the fixing portion 82a and the concave portion 82b also has a ball joint type bearing structure, and is also covered by an extending portion 71c of the second cover member 71b. One of the coupling members 81 is provided between the fixing portion 81a and the first display unit 100a, namely, the first frame 61a, and has rotational degrees of freedom around three axes. The other coupling member 82 is provided between the fixing portion 82a and the second display unit 100b, namely, the second frame 61b, and has rotational degrees of freedom around three axes. By using such coupling members 81, 82, the degree of freedom of relative positioning between the first display unit 100a and the second display unit 100b can be increased.

The first frame 61a is a semi-circular plate-shaped metal member, and is formed, for example, from a magnesium alloy. By forming the first frame 61a from the magnesium alloy, heat dissipation efficiency of heat generated by the display element 11a, etc. can be increased. The concave portions 81b are formed at both the left and right ends of the first frame 61a, but only one of the concave portions 81b is used for coupling with the fixing member 78. An optical aperture OA is formed at the first frame 61a, and a plate-shaped optical element 28 that seals the optical aperture OA is disposed. The plate-shaped optical element 28 is part of the first optical system 12a. The second frame 61b is a semi-circular metal member, and is formed, for example, from a magnesium alloy. By forming the second frame 61b from the magnesium alloy, heat dissipation efficiency of heat generated by the display element 11b, etc. can be increased. The concave portions 82b are formed at both the left and right ends of the second frame 61b, but only one of the concave portions 82b is used for coupling with the fixing member 78. An optical aperture OA is also formed at the second frame 61b, and a plate-shaped optical element 28 that seals the optical aperture OA is disposed.

Figure 7:
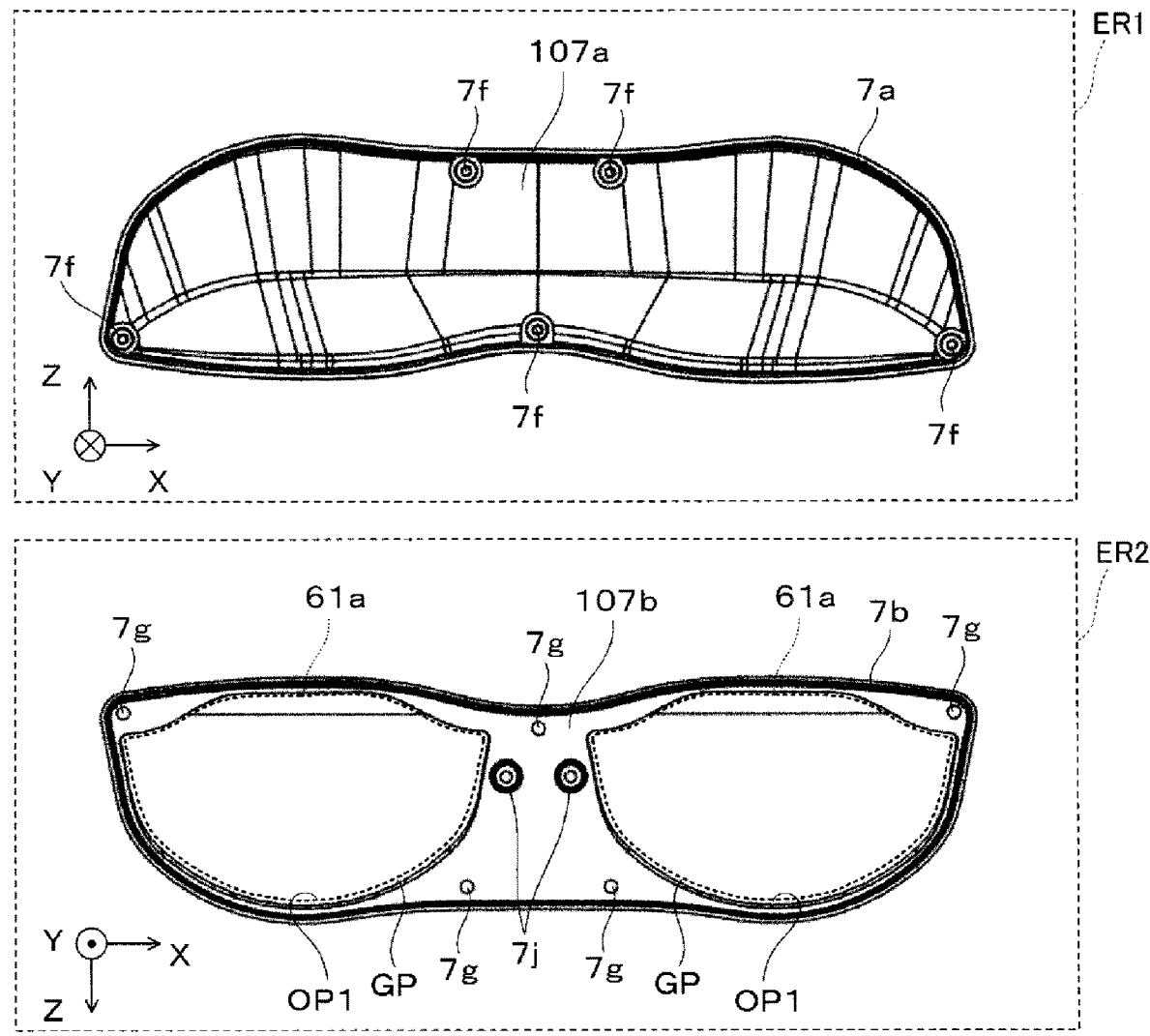
FIG. 7 illustrates a bottom view of an upper exterior member and a plan view of a lower exterior member.

The upper exterior member 107a and the lower exterior member 107b will be described with reference to FIG. 7. In FIG. 7, a region ER1 is a bottom view illustrating the inside of the upper exterior member 107a, and a region ER2 is a plan view illustrating the inside of the lower exterior member 107b. The upper exterior member 107a and the lower exterior member 107b are formed from a resin material. An outer edge 7a of the upper exterior member 107a and an outer edge 7b of the lower exterior member 107b have the same shape. By abutting them, a space for accommodating the first optical system 12a and the second optical system 12b illustrated in FIG. 3 can be formed. The upper exterior member 107a and the lower exterior member 107b are fixed using fastening portions 7f, 7g, which are screw holes, etc. The lower exterior member 107b has a pair of openings OP1, and the first frame 61a and the second frame 61b can be disposed at the openings OP1, as indicated by a dotted lines. Gaps GP are provided between the openings OP1 and the frames 61a, 61b, and allows the frames 61a, 61b to shift in position with respect to the X-Y plane or the Y direction within the openings OP1. That is, the first display unit 100a and the second display unit 100b illustrated in FIG. 3, etc. are fixed to the lower exterior member 107b while remaining aligned with each other, and even in a state of being accommodated in the upper exterior member 107a and the lower exterior member 107b, the positional relationship between the display units 100a, 100b upon completion of positioning is maintained. Screwing hole 7j are formed at the lower exterior member 107b and can be fixed by screwing to a pair of fastening portions 78z provided at a bridge 78a of the fixing member 78.

Referring to FIGS. 3 and 4, an sealing member 75 is disposed above the first frame 61a and the second frame 61b. The sealing member 75 is a rubber-like elastic sheet or waterproof sheet, and has flexibility. The sealing member 75 is interposed between the first frame 61a and the second frame 61b, and the upper exterior member 107a and the lower exterior member 107b illustrated in FIG. 2, to maintain an internal space IS of the exterior member 107 in a liquid-tight or air-tight manner. Here, the sealing by the sealing member 75 is not limited to complete air tightness, and also includes a level such as a drop or dust prevention.

With reference to FIG. 3, a rectangular plate-shaped circuit board 91 is disposed above the fixing member 78 between the left and right display units 100a, 100b. The circuit board 91 includes a control device 92 that controls display operation of the first display element 11a and the second display element 11b. The control device 92 outputs a drive signal corresponding to the display image to the left and right display elements 11a, 11b to control the display operation of the left and right display elements 11a, 11b. The control device 92 includes, for example, an IF circuit, a signal processing circuit, etc., and causes the left and right display elements 11a, 11b to display a two-dimensional image according to the image data or the image signal received from the outside. Although not shown, the control device 92 includes a main board that controls the operation of the first display device 100A and the operation of the second display device 100B. The main substrate may have, for example, an interface function that communicates with an external device (not shown) and performs signal conversion on a signal received from the external device, and an integrated function that links between the display operation of the first display device 100A and the display operation of the second display device 100B. In order to draw a communication line extending from the circuit board 91 to the outside, a conductive opening (not illustrated) is produced at an appropriate position on the upper exterior member 107a, and the periphery of an insertion opening is also liquid-tightly sealed.

The circuit board 91 is supported on the fixing member 78 by a substrate support portion 74. The circuit board 91 is fixed at the substrate support portion 74. The substrate support portion 74 is a member made of resin covering the fixing member 78 from the upper, front, and rear, and is detachable from the fixing member 78 together with the circuit board 91 by a snap fit using a fitting portion 51.

Figure 8:
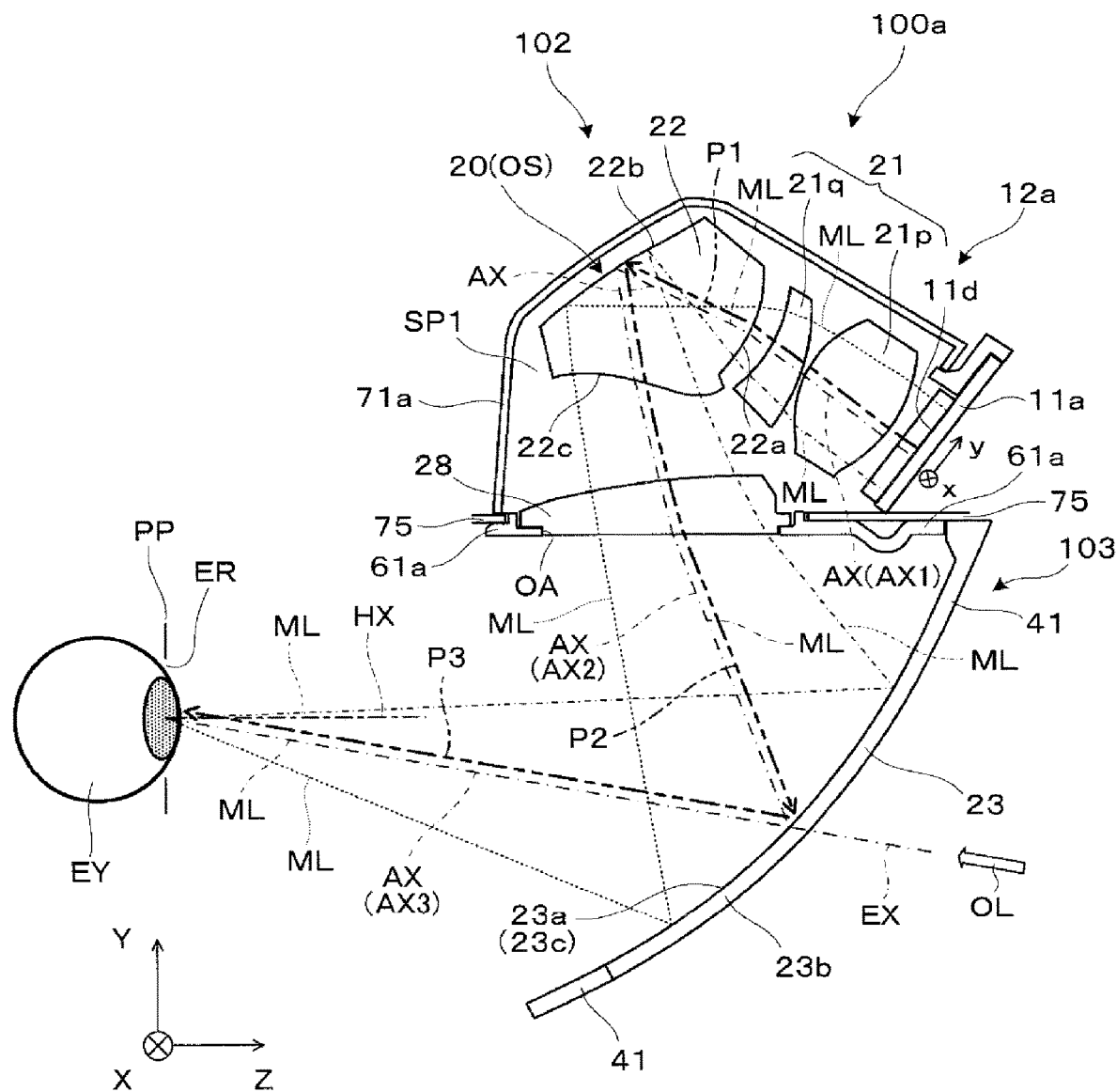
FIG. 8 is a conceptual side cross-sectional view illustrating an optical system inside the image display device.

FIG. 8 is a side cross-sectional view illustrating an optical structure of the first display unit 100a. The first display unit 100a includes the first display element 11a and an imaging optical system 20. The imaging optical system 20 is also referred to as a light guide optical device. The imaging optical system 20 includes a projection lens 21, a prism mirror 22, the plate-shaped optical element 28, and a see-through mirror 23. The projection lens 21, the prism mirror 22, and the plate-shaped optical element 28 of the imaging optical system 20 correspond to the first optical system 12a illustrated in FIG. 3, etc., and the see-through mirror 23 corresponds to the first combiner 103a. The first optical system 12a cooperates with the first combiner 103a to emit imaging light ML toward a pupil position PP. The first display element 11a, the projection lens 21, and the prism mirror 22 are fixed to the first frame 61a in a state of being aligned with each other by a frame body (not illustrated), and is accommodated in a space SP1 sandwiched between the first cover member 71a and the first frame 61a. The plate-shaped optical element 28 is disposed so as to be fitted into a step formed at the optical aperture OA of the first frame 61a, and the periphery of the optical aperture OA is kept airtight state.

The first display element 11a is a spontaneous light emission type display device. The first display element 11a is, for example, an organic EL (Organic Electro-luminescence) display, and forms a color still image or moving image on a two-dimensional display surface 11d. The first display element 11a is disposed along the X-Y plane that is inclined by being rotated about the X-axis with respect to an X-Y plane. The first display element 11a is driven by the control device 92 provided at the circuit board 91 to perform display operation. The first display element 11a is not limited to the organic EL display, and can be replaced with a micro LED display or a display device using an inorganic EL, an organic LED, a laser array, a quantum dot light emitting element, etc. The first display element 11a is not limited to a spontaneous light emission type imaging light generation device, and may include an LCD and another light modulation element, and may form an image by illuminating the light modulation element with a light source such as a backlight. As the first display element 11a, a LCOS (Liquid crystal on silicon, LCoS is a registered trademark), a digital micro-mirror device, etc. may be used instead of an LCD.

The projection lens 21 causes the imaging light ML emitted from the first display element 11a to pass therethrough and then to be incident on the prism mirror 22. The projection lens 21 includes a first lens 21p and a second lens 21q, and focuses the imaging light ML emitted from the first display element 11a into a state close to a parallel luminous flux. The prism mirror 22 has an inner reflection surface 22b, and causes the imaging light ML emitted from the projection lens 21 to be incident on a light incident surface 22a, to be totally reflected by the inner reflection surface 22b, and to be emitted from a light emission surface 22c. At this time, the prism mirror 22 emits the imaging light ML incident from the front such that it is bent in a direction inclined with respect to a direction in which an incident direction is reversed (a direction of the light source seen from the prism mirror 22). The plate-shaped optical element 28 causes the imaging light ML from the prism mirror 22 to pass therethrough while refracting it, and then to be incident on the see-through mirror 23.

The see-through mirror 23 is a curved plate-shaped optical member that serves as a concave surface mirror, and reflects the imaging light ML incident from the prism mirror 22 via the plate-shaped optical element 28 toward a pupil position PP. The pupil position PP is a position at which the imaging light ML from each of points on the display surface 11d is incident so as to be overlapped from an angular direction corresponding to a position of each of points on the display surface 11d in a predetermined divergent state or a parallel state. The see-through mirror 23 covers the pupil position PP at which the eye EY or the pupil is disposed, has a concave shape toward the pupil position PP, and has a convex shape toward the outside. The see-through mirror 23 is a mirror plate having a structure in which a mirror film 23c is formed at a front surface or a back surface of a plate-shaped body 23b. The reflection surface 23a of the see-through mirror 23 has transmissive properties. The external light OL that has passed through the see-through mirror 23 and a support plate 41 therearound is also incident on the pupil position PP. In other words, the wearer US wearing the image display device 200 can observe a virtual image of the imaging light ML in a state in which the imaging light ML overlaps with the external image.

In the above, optical surfaces constituting the projection lens 21, the prism mirror 22, the plate-shaped optical element 28, and the see-through mirror 23 includes a free-form surface, and at least some of the optical surfaces may be replaced with an aspheric surface or a spherical surface.

The imaging optical system 20 is an off-axis optical system OS due to the see-through mirror 23 being a concave mirror, etc. In the case of the present exemplary embodiment, the projection lens 21, the prism mirror 22, the plate-shaped optical element 28, and the see-through mirror 23 are disposed non-axisymmetric and have a non-axisymmetric optical surface. In the imaging optical system 20, that is, the off-axis optical system OS, an optical axis AX is bent so that the optical axis AX extends along an off-axis surface (a surface parallel to the Y-Z surface) corresponding to a plane of the drawing. In the imaging optical system 20, the optical elements 21, 22, and 23 are arranged along the off-axis surface by bending the optical axis AX in the off-axis plane parallel to the Y-Z plane. The imaging optical system 20 includes optical axis portions AX1, AX2, and AX3 that are disposed along the off-axis surface (a surface parallel to the Y-Z plane) which is a reference surface extending in the longitudinal direction and are inclined with respect to each other before and after the reflection surface. The optical axis AX as a whole extends along an optical path of the main rays emitted from the center of the display element 11a and passes through the center of the eye ring ER or the pupil corresponding to an eye point. The optical axis AX is disposed in a Z shape by the plurality of optical axis portions AX1, AX2, and AX3 when seen in a transverse cross section parallel to the Y-Z plane. In other words, in the off-axis surface parallel to the Y-Z plane, an optical path P1 from the projection lens 21 to an inner reflection surface 22b, an optical path P2 from the inner reflection surface 22b to the see-through mirror 23, and an optical path P3 from the see-through mirror 23 to the pupil position PP are arranged to be bent in a Z shape in two stages.

Figure 9:
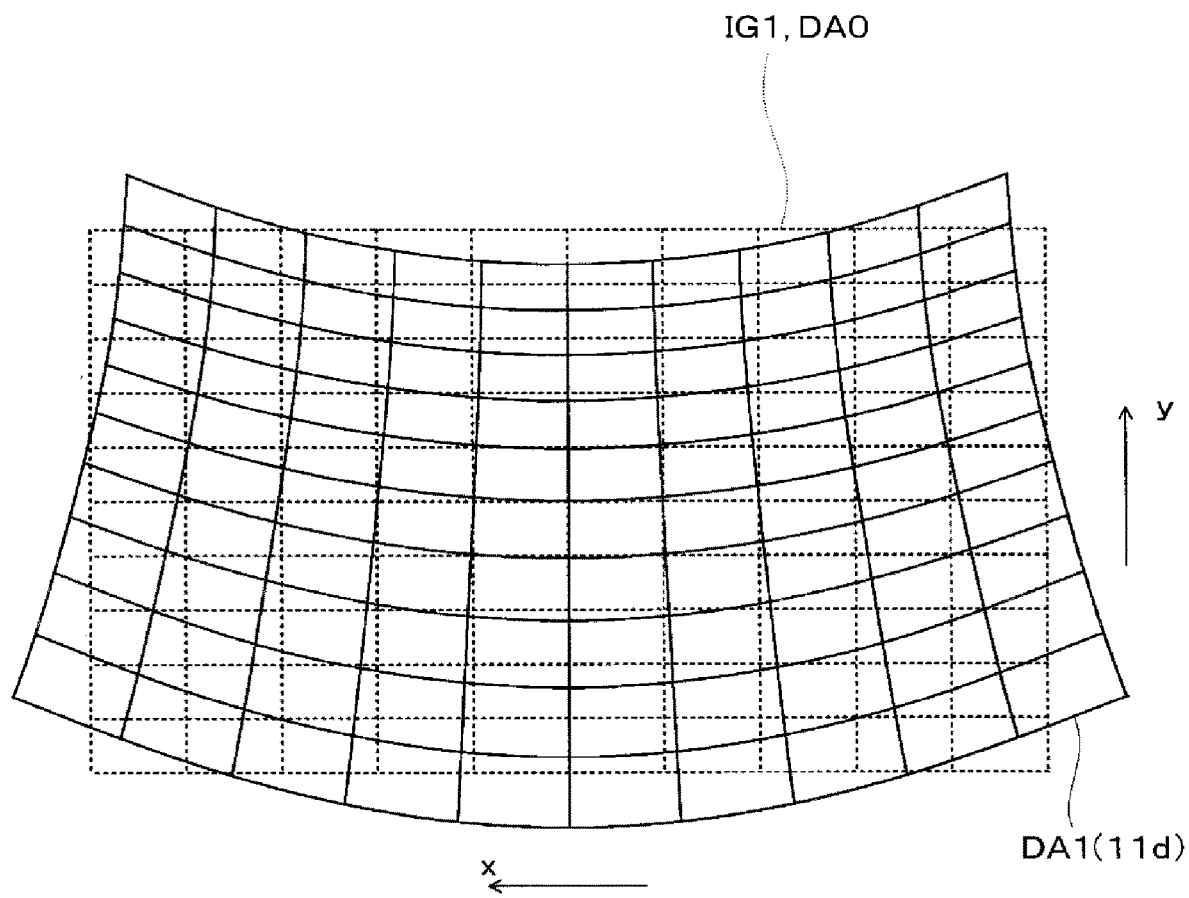
FIG. 9 is a diagram illustrating distortion correction of a display image.

As illustrated in FIG. 9, the display image formed at the display surface 11d of the first display element 11a is set to a modified image DA1 having a distortion such as trapezoidal distortion. That is, since the imaging optical system 20 is the off-axis optical system OS, it is not easy for the optical system itself to remove distortion such as trapezoidal distortion. In this way, a pixel array of a projected image IG1 of the virtual image observed at the pupil position PP via the imaging optical system 20 can be made into a grid pattern corresponding to an original display image DA0, and the outline thereof can be made rectangular by causing the image displayed on the first display element 11a to have reverse distortion that cancels out the distortion formed by the projection lens 21, the prism mirror 22, the plate-shaped optical element 28, and the see-through mirror 23. In other words, the first display element 11a corrects the distortion formed by the projection lens 21, the prism mirror 22, the plate-shaped optical element 28, and the see-through mirror 23. As a result, aberrations can be suppressed as a whole including the first display element 11a while allowing the distortion generated by the see-through mirror 23, etc. Thus, the degree of freedom in the arrangement and size of optical elements such as the prism mirror 22 is increased, and it is possible to easily secure the optical performance of the first display unit 100a while achieving miniaturization of the first display unit 100a.

Although the first display unit 100a has been described above, the second display unit 100b has a similar structure to that of the first display unit 100a, and thus a description of the specific structure thereof will be omitted.

Hereinafter, the sealing member 75 will be described with reference to FIG. 10. The sealing member 75 has an outline shape similar to that of the exterior member 107 as seen in plan view, and extends elongated in the lateral X direction. The sealing member 75 is a waterproof sheet formed of an independent foam material such as "PORON®" and has a uniform thickness. The sealing member 75 has cushioning properties and is elastically deformable. The thickness of the sealing member 75 is set to approximately 0.5 mm, for example, but is not limited thereto. By making the sealing member 75 elastically deformable, the tolerance of adjusting the positions of the first frame 61a and the second frame 61b with respect to the exterior member 107 can be increased. A pair of openings OP21 and OP22 are formed at the sealing member 75. An outer circumferential portion 75o of the sealing member 75 functions as an outer first sealing portion 75f, as illustrated in a fine dot pattern in the drawings. The outer circumferential portion 75o is sandwiched between the outer edges 7a and 7b of the exterior member 107, and is fixed in close contact with the exterior member 107. Two second sealing portions 75s are provided between the outer circumferential portion 75o of the sealing member 75 and the openings OP21, OP22, in other words, on the inner side of the first sealing portion 75f, as illustrated by a fine dot pattern in the drawing. The two second sealing portions 75s correspond to the outer peripheries of the first frame 61a and the second frame 61b, and are attached to the outer peripheral upper surfaces of the both frames 61a, 61b.

After assembly, the first frame 61a and the second frame 61b are disposed on the underside or −Y side of the sealing member 75, and the periphery of the openings OP21, OP22 is supported at the first frame 61a and the second frame 61b. At this time, the first optical system 12a protrudes and is exposed on the opposite side or the +Y side of the first frame 61a via the opening OP21. Furthermore, the second optical system 12b protrudes and is exposed on the opposite side or the +Y side of the second frame 61b via the opening OP22.

The first cover member 71a is disposed on the upper surface side or the +Y side of the sealing member 75 to cover the first optical system 12a, and the second cover member 71b is disposed on the upper surface side or the +Y side of the sealing member 75 to cover the second optical system 12b. An insertion hole 8g corresponding to the fastening portion 7f, etc. formed at the upper exterior member 107a illustrated in FIG. 7 is formed around the sealing member 75, and an insertion hole 8j corresponding to the screwing hole 7j of the lower exterior member 107b illustrated in FIG. 7 is formed in the center of the sealing member 75.

The sealing in the image display device 200 will be described with reference to FIG. 11. The first sealing portion 75f formed outside of the sealing member 75 performs sealing between the first sealing portion 75f and the exterior member 107. The first sealing portion 75f is sandwiched between the upper exterior member 107a and the lower exterior member 107b constituting the exterior member 107, and is fixed to the exterior member 107. An outward step 7p is formed at the outer edge 7a of the upper exterior member 107a, an inward step 7q is formed at the outer edge 7b of the lower exterior member 107b, and the upper exterior member 107a and the lower exterior member 107b are engaged with each other by the fitting of these steps 7p, 7q. A gap G1 is formed at the steps 7p, 7q abutted, and the first sealing portion 75f is elastically deformed and tightly sandwiched in the gap G1. As illustrated in FIG. 10, the first sealing portion 75f is provided in an annular shape along the outer periphery of the upper exterior member 107a and the lower exterior member 107b.

The second sealing portion 75s formed inside the first sealing portion 75f in the sealing member 75 performs sealing between the second sealing portion 75s and the first frame 61a. The second sealing portion 75s is attached and fixed to an upper surface 61m of an outer peripheral region of the first frame 61a via an adhesive layer 93. In other words, the adhesive layer 93 is provided between the first frame 61a and an main body 75z of the sealing member 75. Here, the adhesive layer 93 functions as part of the second sealing portion 75s, and the second sealing portion 75s is fixed in a state of being attached to the first frame 61a via the adhesive layer 93. The second sealing portion 75s and the adhesive layer 93 are provided in an annular shape along the outer periphery of the first frame 61a (see FIG. 10). Note that, in the sealing member 75, the inner circumferential portion 75i corresponding to the edge of the opening OP21 or the vicinity thereof is pressed by a lower end 71e of the first cover member 71a.

An intermediate region 75t of the sealing members 75, which is sandwiched between the first sealing portion 75f and the second sealing portion 75s and extends in the lateral direction, couples the first sealing portion 75f and the second sealing portion 75s to seal the internal space IS of the exterior member 107. Since the intermediate region 75t is elastically deformed, the first frame 61a is allowed to shift slightly with respect to the lower exterior member 107b, etc., which allows positioning of the first frame 61a or the first display unit 100a that does not refer to the exterior member 107. Note that the exterior member 107 is manufactured by a technique that does not require relatively precise shape; however, when the exterior member 107 is manufactured with high precision, the positioning can be achieved by directly fixing the first display unit 100a to the exterior member 107 without interposing the fixing member 78.

By using the sealing member 75, the first frame 61a is disposed like a lid that covers the opening OP1 of the exterior member 107, while the gap GP can be ensured between the both, and sealing in the exterior member 107 can be achieved.

In the above, sealing around the first display unit 100a of the image display device 200 has been described, but the same applies to the sealing around the second display unit 100b. Of the sealing of the second display unit 100b, the portion relative to the exterior member 107 is common to the first display unit 100a, and uses the first sealing portion 75f of the sealing member 75. Of the sealing of the second display unit 100b, the portion relative to the second frame 61b uses the second sealing portion 75s provided surrounding the opening OP22 of the sealing member 75.

Figure 10:
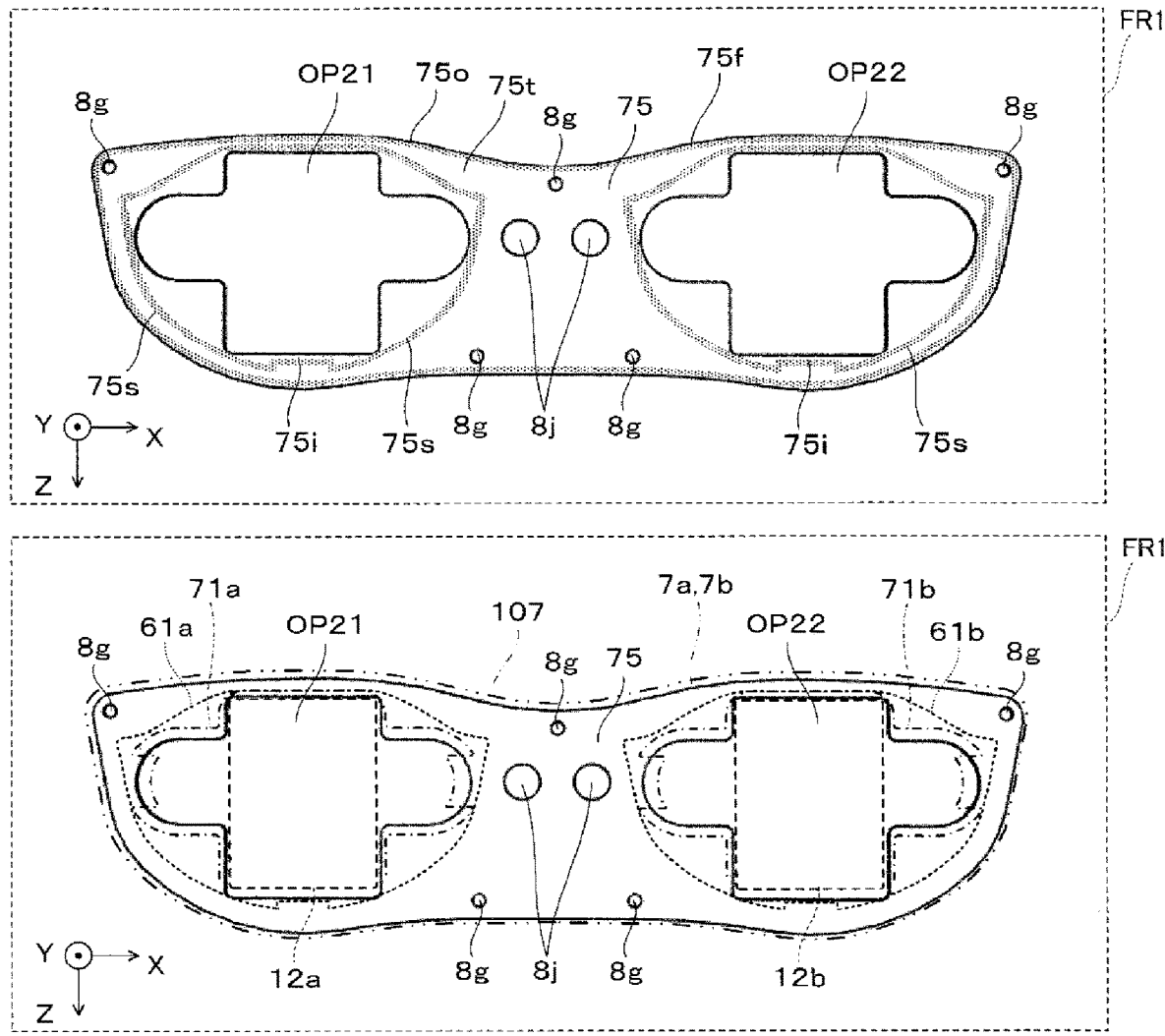
FIG. 10 is a plan view illustrating a sealing member.
Figure 11:
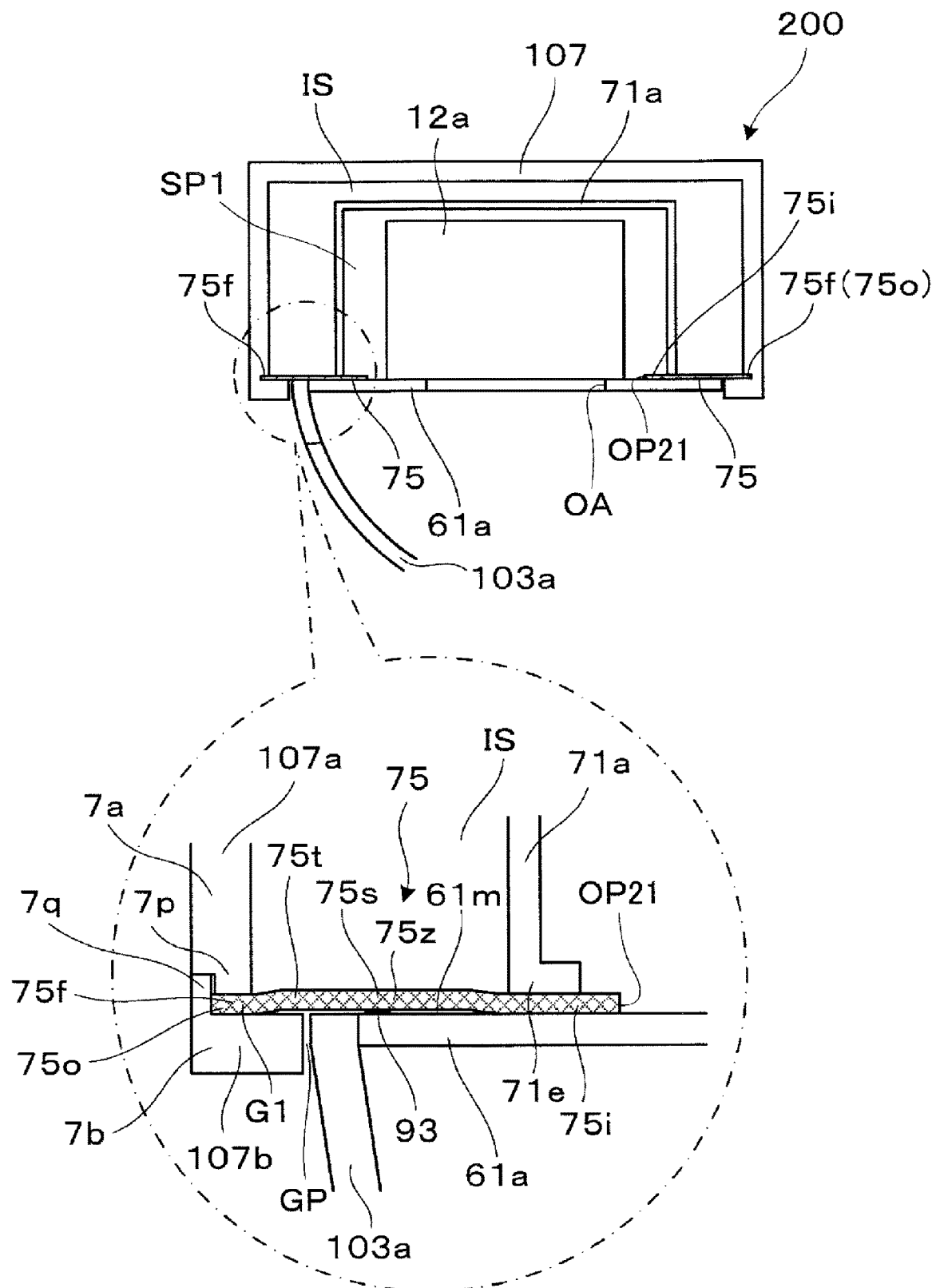
FIG. 11 is a conceptual side view illustrating a sealing structure of the image display device.

The outer shape of the sealing member 75 is greater than the plate-shaped outer shape of the first frame 61a and the second frame 61b, and the first sealing portion 75f is disposed outside the two second sealing portions 75s so as to collectively surround the two second sealing portions 75s (see FIG. 10). In the center of the sealing member 75, the sealing member 75 is disposed on the lower side of the fixing member 78 coupled to the first frame 61a and the second frame 61b (see FIG. 3). In other words, the sealing member 75 is sandwiched between the fixing member 78 and the first frame 61a of the first display unit 100a, and is sandwiched between the fixing member 78 and the second frame 61b of the second display unit 100b. By disposing the sealing member 75 in this manner, the periphery of the fixing member 78 can be sealed, and the fluid tightness or air tightness in the space SP1 can be maintained. When the lower exterior member 107b is fixed to the fixing member 78, the periphery of the insertion hole 8j and the fixing member 78 is kept in a liquid-tight or air-tight manner and sealed. The insertion hole 8g for fixing the upper exterior member 107a to the lower exterior member 107b is also sealed by the fastening portion 7f and the surrounding members.

While detailed illustration is omitted, the internal space IS of the exterior member 107 is in communication with the space SP1 sandwiched between the first cover member 71a and the first frame 61a, and is not completely separated. By forming the lower end of the first cover member 71a in an annular shape and fixing it to the upper surface 61m of the first frame 61a so as to press the sealing member 75, the internal space IS and the space SP1 can be separated.

Hereinafter, the manufacturing or assembling of the image display device 200 will be described. First, the first optical system 12a and the first combiner 103a are fixed to the first frame 61a, and the display element 11a is fixed while being positioned with respect to the first optical system 12a using the first holder 72a, etc. This results in a right eye unit RU including the first display unit 100a (see FIG. 4). In parallel, the second optical system 12b and the second combiner 103b are fixed to the second frame 61b, and the display element 11b is fixed while being positioned with respect to the second optical system 12b using the second holder 72b, etc. This results in a left eye unit LU including the second display unit 100b is obtained (see FIG. 4). Thereafter, the right eye unit RU and the left eye unit LU are set in a two-lineage measurement device, and the sealing member 75 is fixed on the first frame 61a and the second frame 61b. At this time, the second sealing portion 75s of the sealing member 75 is attached to both of the frames 61a, 61b via the adhesive layer 93. As a result, the OP21, OP22 inside the sealing member 75 are sealed by the first frame 61a and the second frame 61b. Furthermore, the first fixing portion 81a of the fixing member 78 is fitted into the first concave portion 81b of the first frame 61a, and the second fixing portion 82a of the fixing member 78 is fitted into the second concave portion 82b of the second frame 61b. The stage of the two-lineage measurement device is then utilized to precisely adjust the angle and arrangement of the right eye unit RU and the left eye unit LU. At this time, the right eye unit RU and the left eye unit LU can independently rotate in the R1 direction about the X-axis, the R2 direction about the Y-axis, and the R3 direction about the Z-axis, in a state where the right eye unit RU and the left eye unit LU are coupled by the fixing member 78 (see FIG. 4, etc.). Note that the sealing member 75 is elastically deformed, and relative displacement of both frames 61a, 61b is allowed. After the position adjustment is complete, the adhesive supplied in advance between the first fixing portion 81a and the first concave portion 81b is cured, and the adhesive supplied in advance between the second fixing portion 82a and the second concave portion 82b is cured. This completes alignment of the right eye unit RU and the left eye unit LU. Thereafter, the first cover member 71a is covered so as to cover the first optical system 12a from above the first frame 61a, and the extending portion 71c provided thereon is screwed into the first concave portion 81b side of the first frame 61a via the screwing hole formed therein and the first fixing portion 81a. As a result, the fixing of the first cover member 71a with respect to the first frame 61a is completed. The method of fixing the second cover member 71b to the second frame 61b is the same as the method of fixing the first cover member 71a to the first frame 61a, so that description thereof is omitted. Next, the circuit board 91 is attached to the fixing member 78 using the substrate support portion 74, and the FPC extending from the display elements 11a, 11b is coupled to the circuit board 91. Finally, the lower exterior member 107b is fixed to the fixing member 78 using the pair of fastening portions 78z provided at the fixing member 78, and then the upper exterior member 107a is fixed to the lower exterior member 107b. At this time, the first frame 61a and the second frame 61b are allowed to shift slightly with respect to the lower exterior member 107b, and the positioning of the first display unit 100a and the first display unit 100b with respect to the fixing member 78 is maintained. Furthermore, by sandwiching the outer circumferential portion 75a, that is, the first sealing portion 75f, of the sealing member 75 between the outer edge 7a of the upper exterior member 107a and the outer edge 7b of the lower exterior member 107b, sealing is achieved therebetween. That is, the internal space IS of the exterior member 107 is sealed.

The image display device 200 according to the exemplary embodiment described above includes the display units 100a, 100b including the optical systems 12a, 12b configured to emit the imaging light ML toward the pupil position PP, and the frames 61a, 61b configured to support the optical systems 12a, 12b, the exterior member 107 configured to accommodate the optical systems 12a, 12b of the display units 100a, 100b in the internal space IS, and partially exposes the frames 61a, 61b, and the sheet-shaped sealing member 75 having flexibility configured to seal the internal space IS of the exterior member 107, wherein the sealing member 75 includes the outer first sealing portion 75f configured to perform sealing between the sealing member 75 and the exterior member 107, and the inner second sealing portion 75s configured to perform sealing between the sealing member 75 and the frames 61a, 61b. As a result, the inside and outside of the exterior member 107 can be separated by the frame 61a, 61b, and the liquid tightness or air tightness of the internal space IS that accommodates the optical systems 12a, 12b can be maintained, whereby reliable sealing of the internal space IS can be achieved while reducing the size and weight of the exterior member 107. At this time, due to the flexibility of the sealing member 75, the positions of the frames 61a, 61b, that is, the display units 100a, 100b, can be adjusted with respect to the exterior member 107.

Modified Examples and Others

The present disclosure is described according to the above-described embodiments, but the present exemplary disclosure is not limited to the above-described embodiments. The present exemplary disclosure may be carried out in various modes without departing from the gist of the present disclosure, and, for example, the following modifications may be carried out.

The image display device 200 may be a single eye display device. In other words, it can be used as a display device including only the first display unit 100a, omitting the second display unit 100. In this case, the exterior member 107 is small in which only the first display unit 100a is accommodated.

The first sealing portion 75f of the sealing member 75 is not limited to being sandwiched and fixed between the upper exterior member 107a and the lower exterior member 107b, but can be fixed to the exterior member 107 by adhesion. In addition, the second sealing portion 75s is not limited to being attached to the first frame 61a, but can be sandwiched and fixed between the first frame 61a and the associated part (for example, the first cover member 71a). The sealing member 75 need not be an integral product, and for example, the first sealing portion 75f and the second sealing portion 75s can be attached to the inside and outside of the sheet-shaped member. While it is desirable that the first sealing portion 75f and the second sealing portion 75s achieve sealing that is formed in an annular shape without cuts, but the sealing may be partially formed with cuts or discontinuities to an extent which does not cause problems with waterproof or anti-drop specifications.

The imaging optical system 20 incorporated into the first display unit 100a is not limited to that illustrated, and may have various configurations. Specifically, the imaging optical system 20 described above is the off-axis optical system OS that is asymmetric in the Y direction or the longitudinal direction, but may also be an off-axis optical system that is asymmetric in the X direction or the lateral direction. The optical elements constituting the imaging optical system 20 are merely exemplary in FIG. 8, and changes can be made, such as increasing or decreasing the number of lenses, adding a light-guiding member, etc.

A light control device that controls light by limiting the transmitted light of the combiners 103a, 103b can be attached on an external side of the combiners 103a, 103b. The light control device adjusts a transmittance, for example, electrically. Mirror liquid crystals, electronic shades, etc. may be used as the light control device. The light control device may adjust a transmittance according to outside light brightness.

The combiner 103a, 103b may be replaced with a mirror having light blocking properties. In this case, the optical system is a non-see-through type optical system that does not assume direct observation of an external image.

The first frame 61a, the second frame 61b, and the fixing member 78 are not limited to being formed from a metal material, and may be formed from fiber-reinforced plastic (FRP).

The sealing member 75 can be formed from an independent foam material, but is not limited to this, and can be formed from various elastic resin materials.

The structure of the coupling members 81, 82 is not limited to one having a ball joint shape, and can be replaced with various mechanisms having increased rotational degrees of freedom around two or more axes.

In the description above, although it was assumed that the image display device 100 was worn on the head and is used, the image display device 100 may also be used as a handheld display that is not worn on the head and is to be looked into like binoculars. In other words, the head-mounted display also includes a hand-held display in the present disclosure.

An image display device according to a specific aspect includes a display unit including an optical system configured to emit imaging light toward a pupil position, and a frame configured to support the optical system, an exterior member configured to accommodate the optical system of the display unit in an internal space and partially exposes the frame, and a sheet-shaped sealing member having flexibility configured to seal the internal space of the exterior member, wherein the sealing member includes an outer first sealing portion configured to perform sealing between the sealing member and the exterior member, and an inner second sealing portion configured to perform sealing between the sealing member and the frame.

In the image display device described above, in the sealing member, the first sealing portion performs sealing between the sealing member and the exterior member, and the second sealing portion performs sealing between the sealing member and the frame. Thus, the liquid tightness or air tightness of the internal space in which the optical system is accommodated can be maintained while separating the inside and outside of the exterior member by the frame. At this time, due to the flexibility of the sealing member, the position of the frame, that is, the display unit, can be adjusted with respect to the exterior member.

In a specific aspect, the first sealing portion is sandwiched between an upper exterior member and a lower exterior member constituting the exterior member, and is fixed. In this case, the fixing of the first sealing portion to the exterior member is simple and reliable.

In a specific aspect, the first sealing portion is provided in an annular shape along an outer periphery of the upper exterior member and the lower exterior member. In this case, the sealing member has the first sealing portion as an annular outer circumferential portion.

In a specific aspect, the second sealing portion is fixed to the frame via an adhesive layer. In this case, it is not necessary to particularly provide a structure that fixes the second sealing portion to the frame, and it is easy to simplify and reduce the weight of the frame.

In a specific aspect, an outer shape of the sealing member is greater than an outer shape of the frame, and the first sealing portion is disposed outside of the second sealing portion. In this case, the first sealing portion is disposed outside the outer shape of the frame, making it easy to assemble the frame like a lid covering the opening of the exterior member.

In a specific aspect, the sealing member is disposed at the frame, and the adhesive layer is provided between the frame and a main body of the sealing member. In this case, the adhesive layer is provided in an annular shape at the upper surface of the frame, and the sealing member is disposed entirely on the internal space side of the exterior member.

In a specific aspect, the sealing member includes an opening disposed on inner side of an outer periphery of the frame. In this case, an optical system, etc. can be fixed in the frame region corresponding to the opening of the sealing member.

In a specific aspect, the second sealing portion is provided in an annular shape along the outer periphery of the frame. In this case, sealing is performed at the outer periphery of the frame.

In a specific aspect, the sealing member is an elastically deformable waterproof sheet. In this case, the tolerance of adjusting the position of the frame or display unit with respect to the exterior member can be increased.

In a specific aspect, the display unit includes a first display unit and a second display unit each having the optical system and the frame, and the sealing member adheres to the frame of the first display unit and the frame of the second display unit at the second sealing portion on the inner side. In this case, a type of the image display device that emits the imaging light into the left and right eyes can be obtained by the first display unit and the second display unit.

In a specific aspect, a fixing member configured to relatively fix the first display unit and the second display unit with respect to each other is included, and the sealing member is sandwiched between the fixing member and the frame of the first display unit, and between the fixing member and the frame of the second display unit. In this case, the first display unit and the second display unit can be positioned and fixed to the sealing member, and the periphery of the fixing member can be sealed.

In a specific aspect, bearing-shaped coupling members are provided between the fixing member and the first display unit, and between the fixing member and the second display unit, respectively, each of the bearing-shaped coupling members having rotational degrees of freedom around three axes. In this case, the degree of freedom of relative positioning between the first display unit and the second display unit can be increased.

What is claimed is:

1. An image display device comprising:
    a first display unit that includes:
        a first optical system that emits an imaging light toward a pupil position, and
        a first frame that supports the first optical system;
    a first cover member that accommodates the first optical system and that exposes a portion of the first frame;
    an exterior member that accommodates the first cover member; and
    a sheet-shaped member that has flexibility and that includes:
        a first portion that is sandwiched by the exterior member, and
        a second portion that is sandwiched between the first frame and the first cover member, wherein
    the exterior member includes a first exterior member and a second exterior member,
    the first portion that is sandwiched between the first exterior member and the second exterior member, and
    the first portion is provided in an annular shape along an outer periphery of the first exterior member and the second exterior member.

2. The image display device according to claim 1, comprising an adhesive layer configured to attach the second portion to the first frame.

3. The image display device according to claim 2, wherein
    an outer periphery of the sheet-shaped member is greater than an outer periphery of the first frame, and
    in the sheet-shaped member, the first portion is located outside the second portion.

4. The image display device according to claim 3, wherein
the sheet-shaped member is disposed at the first frame, and
the adhesive layer is provided between the first frame and the sheet-shaped member.

5. The image display device according to claim 4, wherein the sheet-shaped member includes an opening on an inner side of the outer periphery of the first frame.

6. The image display device according to claim 1, wherein the second portion is provided in an annular shape along an outer periphery of the first frame.

7. The image display device according to claim 1, wherein the sheet-shaped member is a waterproof sheet having elasticity.

8. The image display device according to claim 1, comprising:
a second display unit including a second optical system configured to emit imaging light toward a pupil position, and a second frame configured to support the second optical system; and
a second cover member configured to accommodate the second optical system and expose a portion of the second frame, wherein
the sheet-shaped member includes a third portion configured to perform by being sandwiched between the second frame and the second cover member.

9. The image display device according to claim 8, comprising a fixing member configured to relatively fix a position of the first display unit with respect to the second display unit, wherein
the sheet-shaped member is sandwiched between the fixing member and the first frame, and between the fixing member and the second frame.

10. The image display device according to claim 9, wherein
bearing-shaped coupling members are provided between the fixing member and the first display unit, and between the fixing member and the second display unit, respectively, each of the bearing-shaped coupling members having rotational degrees of freedom around three axes.

11. An image display device comprising:
a first display unit that includes:
a first optical system that emits an imaging light toward a pupil position, and
a first frame that supports the first optical system;
a first cover member that accommodates the first optical system and that exposes a portion of the first frame;
an exterior member that accommodates the first cover member;
a sheet-shaped member that has flexibility and that includes:
a first portion that is sandwiched by the exterior member, and
a second portion that is sandwiched between the first frame and the first cover member;
a second display unit including a second optical system configured to emit imaging light toward a pupil position, and a second frame configured to support the second optical system; and
a second cover member configured to accommodate the second optical system and expose a portion of the second frame, wherein
the sheet-shaped member includes a third portion configured to perform by being sandwiched between the second frame and the second cover member.

12. The image display device according to claim 11, comprising a fixing member configured to relatively fix a position of the first display unit with respect to the second display unit, wherein
the sheet-shaped member is sandwiched between the fixing member and the first frame, and between the fixing member and the second frame.

13. The image display device according to claim 12, wherein
bearing-shaped coupling members are provided between the fixing member and the first display unit, and between the fixing member and the second display unit, respectively, each of the bearing-shaped coupling members having rotational degrees of freedom around three axes.

* * * * *